(12) United States Patent
Osaki et al.

(10) Patent No.: US 8,915,555 B2
(45) Date of Patent: Dec. 23, 2014

(54) BRAKE CONTROL DEVICE FOR VEHICLE

(71) Applicant: Advics Co., Ltd., Kariya (JP)

(72) Inventors: Shintaro Osaki, Nisshin (JP); Takahiro Kiso, Chiryu (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 46 days.

(21) Appl. No.: 13/778,726

(22) Filed: Feb. 27, 2013

(65) Prior Publication Data

US 2013/0221734 A1 Aug. 29, 2013

(30) Foreign Application Priority Data

Feb. 27, 2012 (JP) ................. 2012-039639

(51) Int. Cl.
| | | |
|---|---|---|
| B60T 8/60 | (2006.01) | |
| B60T 8/48 | (2006.01) | |
| B60T 8/17 | (2006.01) | |
| B60T 7/12 | (2006.01) | |
| B60T 13/18 | (2006.01) | |
| B60T 13/20 | (2006.01) | |
| B60T 8/36 | (2006.01) | |

(52) U.S. Cl.
CPC ............. *B60T 13/20* (2013.01); *B60T 8/4872* (2013.01); *B60T 8/17* (2013.01); *B60T 7/122* (2013.01); *B60T 13/18* (2013.01); *B60T 8/3655* (2013.01)
USPC ........................................ 303/155

(58) Field of Classification Search
CPC ................. B60T 13/20; B60T 13/18
USPC ................................. 303/10, 11, 155
See application file for complete search history.

(56) References Cited

U.S. PATENT DOCUMENTS

| | | | |
|---|---|---|---|
| 8,002,364 B2 | 8/2011 | Kokubo et al. | |
| 8,573,714 B2 * | 11/2013 | Nishimura et al. | ........... 303/155 |
| 2005/0269875 A1 | 12/2005 | Maki et al. | |
| 2007/0228823 A1 | 10/2007 | Kokubo et al. | |

FOREIGN PATENT DOCUMENTS

| | | |
|---|---|---|
| JP | 2001-055127 A | 2/2001 |
| JP | 2002-347592 A | 12/2002 |
| JP | 2006-021745 A | 1/2006 |
| JP | 2007-276500 A | 10/2007 |
| JP | 2009-061815 A | 3/2009 |

* cited by examiner

*Primary Examiner* — Christopher Schwartz

(74) *Attorney, Agent, or Firm* — Buchanan Ingersoll & Rooney PC

(57) ABSTRACT

In the brake control device, a wheel-cylinder hydraulic pressure (Pw) obtained by adding the linear-valve pressure difference to a master-cylinder hydraulic pressure (Pm) is applied to the wheel cylinder while the vehicle is running. When an operation of a brake pedal is started while the vehicle is running (t1), the driving of the hydraulic pump is started. Thereafter, when the vehicle is stopped (t2), the driving of the hydraulic pump is stopped. When the start of movement of the vehicle is detected during an operation of returning the brake pedal (t4) and an operation of re-depressing the brake pedal is detected (t5) in this state (specifically, while the vehicle is in a stopped state, the hydraulic pump is in a stopped state, and the brake pedal is being operated), the driving of the hydraulic pump is started (t5).

4 Claims, 11 Drawing Sheets

BRAKE CONTROL DEVICE FOR VEHICLE

BACKGROUND OF THE INVENTION

1. Field of the Invention

The present invention relates to a brake control device for a vehicle.

2. Description of the Related Art

Conventionally, there is known a brake apparatus including a master cylinder for generating a basic hydraulic pressure (master-cylinder hydraulic pressure) in accordance with an operation of a brake pedal that is performed by a driver of a vehicle, a hydraulic pump for generating a pressure difference generation hydraulic pressure for generating a pressure difference (linear-valve pressure difference) to be added to the basic hydraulic pressure, a pressure control valve (normally-open linear solenoid valve) for adjusting the pressure difference by using the pressure difference generation hydraulic pressure, and a friction brake mechanism for applying, to a wheel cylinder, a wheel-cylinder hydraulic pressure obtained by adding the pressure difference to the basic hydraulic pressure to generate a friction braking force in accordance with the wheel-cylinder hydraulic pressure (see Japanese Patent Application Laid-open No. 2007-276500).

In the brake apparatus described in Japanese Patent Application Laid-open No. 2007-276500, in order to reduce a load of linear solenoid valves, the wheel-cylinder hydraulic pressure is limited to a "minimum necessary hydraulic pressure to maintain a vehicle in a stopped state on a hill" while the vehicle is in a stopped state.

Moreover, for the brake apparatus described above, there is also known a technology for stopping the driving of the hydraulic pumps when a state of the vehicle transits from a moving state to a stopped state by depressing the brake pedal (see Japanese Patent Application Laid-open No. 2006-21745). With this technology, the durability of the hydraulic pumps can be ensured.

The following case is hereinafter considered. Specifically, the driving of the hydraulic pumps is stopped based on the stop of the vehicle by depressing the brake pedal (by an increase in braking torque) while the brake pedal is currently being operated. In this case, although the brake pedal is currently being operated, there may occur an event in which the vehicle starts moving by an operation of returning the brake pedal (by a decrease in braking torque). In this case, a configuration, which starts driving the hydraulic pumps based on the determination that "the vehicle has started moving (the state of the vehicle has transited from the stopped state to the moving state)", is conceivable. However, the configuration described above brings about the following problem.

Specifically, when the driving of the hydraulic pumps is started, there may inevitably occur a phenomenon in which the amount of operation of the brake pedal slightly increases (hereinafter referred to as "brake pedal retraction phenomenon") due to a temporary decrease in the amount of working fluid in a reservoir of the master cylinder. Therefore, in the configuration described above, the "brake pedal retraction phenomenon" occurs during the operation of returning the brake pedal (or immediately after the end of the operation of returning the brake pedal). In other words, a direction of movement of the brake pedal, which is caused by the "brake pedal retraction phenomenon", becomes opposite to that of the brake pedal based on the operation of the brake pedal that is performed by the driver. As a result, there arises a problem in that the driver is undesirably susceptible to discomfort resulting from the operation of the brake pedal.

SUMMARY OF THE INVENTION

It is an object of the present invention to provide a brake control device for a vehicle, for applying, to a wheel cylinder, a wheel-cylinder hydraulic pressure obtained by adding a "pressure difference adjusted by a pressure control valve" to a basic hydraulic pressure, which brings a driver insusceptible to discomfort resulting from a "brake pedal retraction phenomenon" inevitably occurring at the start of driving of a hydraulic pump.

A brake control device for a vehicle according to an exemplary embodiment of the present invention is to be used for a brake apparatus including: basic hydraulic pressure generating means for generating a basic hydraulic pressure in accordance with an operation of a brake operating member that is performed by a driver of the vehicle; a hydraulic pump for generating a pressure difference generation hydraulic pressure for generating a pressure difference to be added to the basic hydraulic pressure; a pressure control valve for adjusting the pressure difference by using the pressure difference generation hydraulic pressure; and a friction brake mechanism for applying, to a wheel cylinder, a wheel-cylinder hydraulic pressure obtained by adding the pressure difference to the basic hydraulic pressure to generate a friction braking force in accordance with the wheel-cylinder hydraulic pressure.

The basic hydraulic pressure generating means includes, for example, a master cylinder for generating the basic hydraulic pressure (master-cylinder hydraulic pressure or vacuum-booster hydraulic pressure) based on actuation of a booster (such as a vacuum booster) in accordance with the operation of the brake operating member that is performed by the driver. The hydraulic pump is, for example, a pump (such as a gear pump) for discharging a brake fluid into a hydraulic circuit capable of generating the wheel-cylinder hydraulic pressure.

The pressure control valve includes, for example, a (normally-open or normally-closed) linear solenoid valve provided between a hydraulic circuit for generating the basic hydraulic pressure and the hydraulic circuit capable of generating the wheel-cylinder hydraulic pressure. By controlling the linear solenoid valve using the pressure difference generation hydraulic pressure, which is generated by the actuation of the hydraulic pump, the pressure difference to be added to the basic hydraulic pressure can be adjusted in a stepless manner. As a result, the wheel-cylinder hydraulic pressure can be adjusted in a stepless manner regardless of the basic hydraulic pressure (hence, regardless of the operation of the brake operating member).

The brake control device according to the exemplary embodiment of the present invention includes: control means "for controlling a driving state of the hydraulic pump" and "for controlling the pressure control valve in accordance with an operation-amount correlation value corresponding to a value correlated to an operation amount of the brake operating member to adjust the pressure difference"; and determination means for determining whether or not the vehicle is in a stopped state. The control means is configured to stop driving the hydraulic pump based on determination of transition of a state of the vehicle from a moving state to the stopped state (by an increase in the operation-amount correlation value or the like).

The brake control device according to the exemplary embodiment of the present invention has a feature in that the control means is configured to start driving the hydraulic pump based on determination of transition of the state of the vehicle from the stopped state to the moving state (by a decrease in the operation-amount correlation value or the like) and determination of an increase in the operation-amount correlation value during the stop of the driving of the hydraulic pump and during the operation of the break operating member. Here, the determination of the "increase in the operation-amount correlation value" can be made, for example, based on whether or not a gradient of increase in the operation-amount correlation value becomes equal to or larger than a predetermined value.

According to the configuration described above, the driving of the hydraulic pump is started when the increase in the operation amount of the brake operating member (typically, re-depression of a brake pedal) is detected after the state of the vehicle transits from the stopped state to the moving state during the operation of the brake operating member based on the decrease in the operation amount of the brake operating member (typically, an operation of returning the brake pedal). In other words, the hydraulic pump is maintained in the stopped state after the vehicle starts moving during the operation of the brake operating member until the brake pedal is re-depressed. When the re-depression of the brake pedal is detected, the driving of the hydraulic pump is started.

In the configuration described above, during the operation of re-depressing the brake pedal (or immediately after the end of the re-depression operation), a "brake pedal retraction phenomenon" occurs. In other words, a direction of movement of the brake pedal that is caused by the "brake pedal retraction phenomenon" is the same as that of movement of the brake pedal based on the operation of the brake pedal that is performed by the driver. Therefore, the driver is insusceptible to discomfort resulting from the "brake pedal retraction phenomenon".

In this case, it is preferred to control the driving state of the hydraulic pump so that a gradient of increase in a rotation speed of the hydraulic pump becomes equal to or smaller than a predetermined value after the driving of the hydraulic pump is started. In general, as the gradient of increase in the rotation speed of the hydraulic pump immediately after the start of driving of the hydraulic pump becomes larger, a speed of increase in the operation amount of the brake pedal due to the "brake pedal retraction phenomenon" (retraction speed) becomes higher. Therefore, according to the configuration described above, a sudden increase in the operation amount of the brake pedal that is caused by the "brake pedal retraction phenomenon" is limited. In other words, the "brake pedal retraction phenomenon" cannot occur significantly (but occurs slowly). Therefore, the driver is further insusceptible to discomfort resulting from the "brake pedal retraction phenomenon".

A case where the brake control device according to the exemplary embodiment of the present invention has the following configuration is hereinafter considered. Specifically, the brake apparatus is configured so that the basic hydraulic pressure is maintained at zero in a range in which the operation-amount correlation value is from zero to a first predetermined value larger than zero, and increases from zero in accordance with an increase in the operation-amount correlation value from the first predetermined value.

In this case, it is preferred that the control means be configured to maintain the pressure difference to be constant when the operation-amount correlation value increases within a range equal to or larger than the first predetermined value after the driving of the hydraulic pump is started. According to the configuration described above, when the operation-amount correlation value increases within the range equal to or larger than the first predetermined value, the pressure difference is maintained to be constant, whereas the basic hydraulic pressure increases to increase the wheel-cylinder hydraulic pressure (=basic hydraulic pressure+pressure difference described above). Therefore, in comparison with the "case where both the basic hydraulic pressure and the pressure difference increase in accordance with an increase in the operation-amount correlation value", the wheel-cylinder hydraulic pressure can be smoothly increased by the amount in accordance with the increase in the operation amount of the brake operating member.

Moreover, it is preferred that the control means be configured to increase the pressure difference in accordance with an increase in the operation-amount correlation value that occurs within a range smaller than the first predetermined value after the driving of the hydraulic pump is started. According to the configuration described above, when the operation-amount correlation value increases within the range smaller than the first predetermined value, the basic hydraulic pressure is maintained at zero. On the other hand, by the increase in the pressure difference, the wheel-cylinder hydraulic pressure (=basic hydraulic pressure+pressure difference described above) increases. Therefore, as compared with the "case where both the basic hydraulic pressure and the pressure difference increase in accordance with an increase in the operation-amount correlation value", the wheel-cylinder hydraulic pressure can be smoothly increased by the amount in accordance with the increase in the operation amount of the brake operating member.

DETAILED DESCRIPTION OF THE PREFERRED EMBODIMENT

In the following, a brake control device for a vehicle according to an embodiment of the present invention is described referring to the accompanying drawings.

Figure 1:
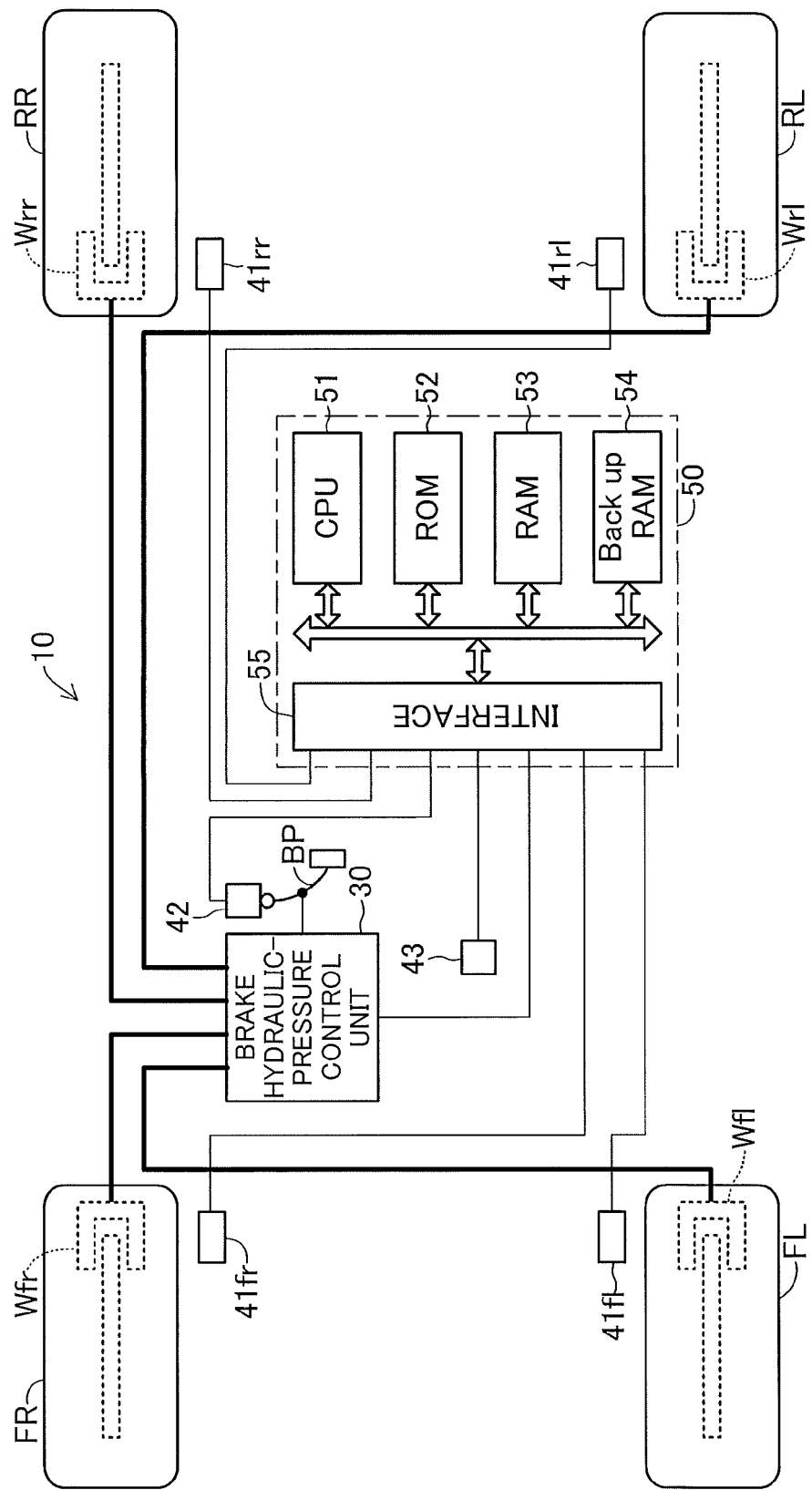
FIG. 1 is a schematic configuration diagram of a vehicle in which a brake control device for a vehicle according to an embodiment of the present invention is mounted.

FIG. 1 illustrates a schematic configuration of a vehicle in which a brake apparatus 10 for a vehicle, including the brake control device for a vehicle according to the embodiment of the present invention, is mounted. The symbol "**" affixed to the end of each of variables is hereinafter a comprehensive notation of the symbols "fr", "fl", and the like to be affixed to the end of each of the variables so as to indicate which of wheels FR, FL, RR, and RL the variable is associated with.

Figure 2:
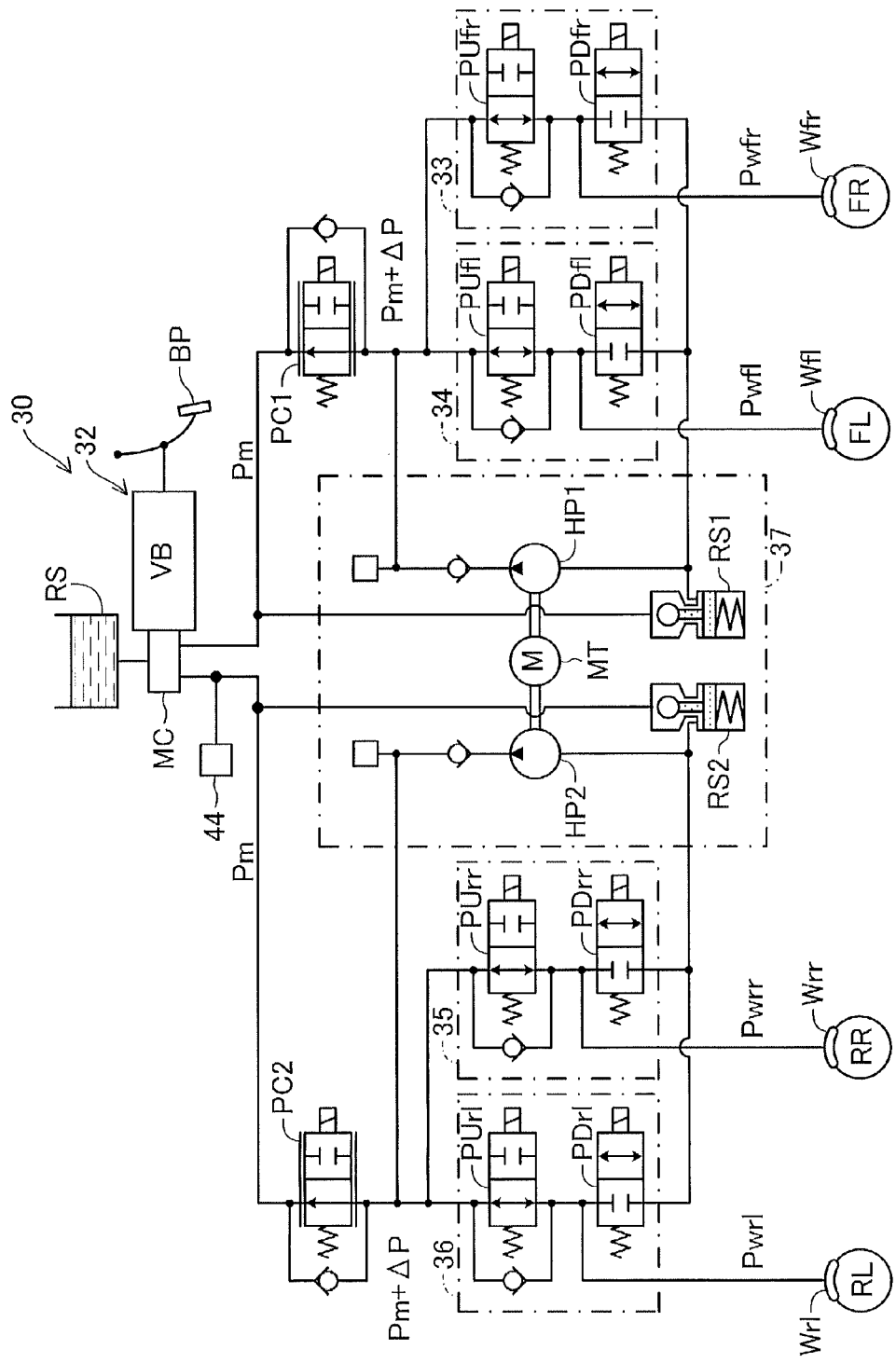
FIG. 2 is a schematic configuration diagram of a brake hydraulic-pressure control unit illustrated in FIG. 1.

The brake apparatus 10 for a vehicle includes a brake hydraulic-pressure control unit 30 for generating a friction braking force (friction braking torque) in a wheel  due to a wheel-cylinder hydraulic pressure. As illustrated in FIG. 2, the brake hydraulic-pressure control unit 30 includes a brake hydraulic-pressure generating section 32 for generating a hydraulic pressure in accordance with a stroke of (or a pedaling force on) a brake pedal BP, brake hydraulic-pressure adjusting sections 33 to 36, each for adjusting the wheel-cylinder hydraulic pressure applied to a wheel cylinder W provided to the wheel , and a reflux brake-fluid supplying section 37. The friction braking torque in accordance with the wheel-cylinder hydraulic pressure of the wheel cylinder W is applied to the wheel **.

The brake hydraulic-pressure generating section 32 includes a vacuum booster VB operating in response to an operation of the brake pedal BP and a master cylinder MC connected to the vacuum booster VB. The vacuum booster VB uses an air pressure (negative pressure) in an intake pipe of an engine (not shown) to assist an operating force on the brake pedal BP at a predetermined rate so as to transmit the assisted operating force to the master cylinder MC.

The master cylinder MC includes two output ports. The master cylinder MC receives the supply of a brake fluid from a reservoir RS to generate and output a hydraulic pressure (master-cylinder hydraulic pressure Pm) in accordance with the assisted operating force from each of the two output ports. The configurations and actuation of the master cylinder MC and the vacuum booster VB are known, and therefore the detailed description thereof is herein omitted. The master-cylinder hydraulic pressure Pm corresponds to the "basic hydraulic pressure".

A normally-open linear solenoid valve PC1 is provided between one of the ports of the master cylinder MC and a portion located upstream of the brake hydraulic-pressure adjusting sections 33 and 34, whereas a normally-open linear solenoid valve PC2 is provided between another of the ports of the master cylinder MC and a portion located upstream of the brake hydraulic-pressure adjusting sections 35 and 36. The details of the linear solenoid valves PC1 and PC2 are described below.

Each of the brake hydraulic-pressure adjusting sections 33 to 36 includes a pressure-intensifying valve PU which is a two-port two-position switchover normally-open solenoid on-off valve and a pressure-reducing valve PD which is a two-port two-position switchover normally-closed solenoid on-off valve. The pressure-intensifying valve PU can bring the portion upstream of a corresponding one of the brake hydraulic-pressure adjusting sections 33 to 36 and the wheel cylinder W into communication with each other and interrupt the communication therebetween. The pressure-reducing valve PD can bring the wheel cylinder W and a corresponding one of reservoirs RS1 and RS2 into communication with each other and interrupt the communication therebetween. As a result, by controlling the pressure-intensifying valve PU and the pressure-reducing valve PD, the hydraulic pressure of the wheel cylinder W (wheel-cylinder hydraulic pressure Pw) can be intensified, kept, and reduced.

The reflux brake-fluid supplying section 37 includes a DC motor MT and two hydraulic pumps (gear pumps) HP1 and HP2 which are simultaneously driven by the DC motor MT. The hydraulic pumps HP1 and HP2 respectively pump up the brake fluids in the reservoirs RS1 and RS2, which are refluxed from the pressure-reducing valve PD**, and supply the pumped braking fluids to the portion located upstream of the brake hydraulic-pressure adjusting sections 33 and 34 and the portion located upstream of the brake hydraulic-pressure adjusting sections 35 and 36, respectively.

The normally-open linear solenoid valves PC1 and PC2 are now described. A force in an opening direction based on a biasing force by a coil spring (not shown) constantly acts on a valve body of each of the normally-open linear solenoid valves PC1 and PC2. In addition, another force in the opening direction and a force in a closing direction also act on the valve body of each of the normally-open linear solenoid valves PC1 and PC2. Specifically, the another force in the opening direction is based on a pressure difference (linear-valve pressure difference $\Delta P$) obtained by subtracting the master-cylinder hydraulic pressure Pm from a pressure at the portion upstream of the corresponding one of the set of the brake hydraulic-pressure adjusting sections 33 and 34 and the set of the brake hydraulic-pressure adjusting sections 35 and 36, whereas the force in the closing direction is based on an attraction force which increases proportionally in accordance with a current (command current Id) supplied to each of the normally-open linear solenoid valves PC1 and PC2.

Figure 3:
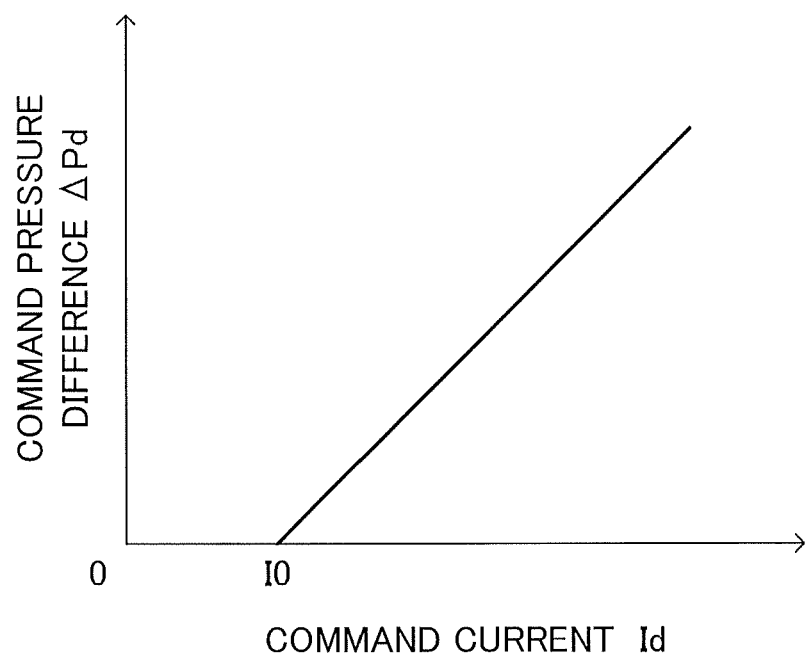
FIG. 3 is a graph showing the relationship between a command current and a command pressure difference for normally-open linear solenoid valves illustrated in FIG. 2.

As a result, as shown in FIG. 3, a command pressure difference ΔPd which is a command value for the linear-valve pressure difference ΔP is determined so as to increase in proportion to the command current Id. Here, a current value I0 corresponds to the biasing force of the coil spring. Each of the normally-open linear solenoid valves PC1 and PC2 is closed when the command pressure difference ΔPd is larger than the linear-valve pressure difference ΔP, and is opened when the command pressure difference ΔPd is smaller than the linear-valve pressure difference ΔP. As a result, when the hydraulic pumps HP1 and HP2 are driven, the brake fluid in the portion located upstream of the corresponding one of the set of the brake hydraulic-pressure adjusting sections 33 and 34 and the set of brake hydraulic-pressure adjusting sections 35 and 36 flows toward a corresponding one of the ports of the master cylinder MC through a corresponding one of the normally-open linear solenoid valves PC1 and PC2. In this manner, the linear-valve pressure difference ΔP can be adjusted so as to become equal to the command pressure difference ΔPd. The brake fluid flowing toward the corresponding port of the master cylinder MC is refluxed to a corresponding one of the reservoirs RS1 and RS2.

In other words, when the motor MT is driven (correspondingly, the hydraulic pumps HP1 and HP2 are driven), the linear-valve pressure difference ΔP can be controlled in accordance with the command current Id of each of the normally-open linear solenoid valves PC1 and PC2. The pressure of the portion at upstream of each of the set of the brake hydraulic-pressure adjusting sections 33 and 34 and the set of the brake hydraulic-pressure adjusting sections 35 and 36 has a value (Pm+PΔ) obtained by adding the linear-valve pressure difference ΔP to the master-cylinder hydraulic pressure Pm. After the driving of the hydraulic pumps HP1 and HP2 is stopped in a state in which the linear-valve pressure difference ΔP is adjusted to a value larger than zero, the linear-valve pressure difference ΔP can still be continuously adjusted only in a decreasing direction by adjusting the command current Id in the decreasing direction.

When the normally-open linear solenoid valves PC1 and PC2 are brought into a de-excited state (specifically, when the command current Id is set to "0"), the normally-open linear solenoid valves PC1 and PC2 are configured to maintain an open state by the biasing forces of the coil springs. At this time, the linear-valve pressure difference ΔP becomes "0", and hence the pressure of the portion upstream of each of the set of the brake hydraulic-pressure adjusting sections 33 and 34 and the set of the brake hydraulic-pressure adjusting sections 35 and 36 becomes equal to the master-cylinder pressure Pm.

With the configuration described above, the brake hydraulic-pressure control unit 30 includes a two-system hydraulic circuit, that is, one system relating to right and left front wheels FR and FL and another system relating to right and left rear wheels RR and RL. In the brake hydraulic-pressure control unit 30, when all the solenoid valves are in the de-energized state, the wheel-cylinder hydraulic pressure Pw** is adjusted to a value equal to the master-cylinder hydraulic pressure Pm.

On the other hand, by driving the motor MT (correspondingly, by driving the hydraulic pumps HP1 and HP2) and controlling the normally-open linear solenoid valves PC1 and PC2 in the above-mentioned state, the wheel-cylinder hydraulic pressure Pw is adjusted to the hydraulic pressure (Pm+ΔP). Further, by controlling the pressure-intensifying valve PU and the pressure-reducing valve PD, the wheel-cylinder hydraulic pressure Pw can be independently adjusted for each wheel. Specifically, a braking force to be applied to the wheel ** can be adjusted independently for each wheel, regardless of the operation of the brake pedal BP that is performed by the driver.

Returning to FIG. 1, the brake apparatus 10 for a vehicle includes wheel-speed sensors 41, a brake-pedal sensor 42, a longitudinal-acceleration sensor 43, and a master-cylinder hydraulic-pressure sensor 44 (see FIG. 2). Each of the wheel-speed sensors 41 detects a rotation speed of a corresponding one of wheels. The brake-pedal sensor 42 selectively outputs a signal in accordance with a stroke (position) of the brake pedal BP. The longitudinal-acceleration sensor 43 detects an acceleration in a longitudinal direction of a vehicle body (longitudinal acceleration). The master-cylinder hydraulic-pressure sensor 44 detects the master-cylinder hydraulic pressure Pm.

The wheel-speed sensors 41** also function as sensors for detecting whether or not the vehicle is stopped. The longitudinal-acceleration sensor 43 has a characteristic of outputting a value in accordance with an inclination angle of the vehicle body in a vehicle-body pitching direction. Therefore, the longitudinal-acceleration sensor 43 also functions as a gradient sensor for detecting a gradient of a road surface in the vehicle-body pitching direction while the vehicle is in the stopped state.

The brake apparatus 10 for a vehicle further includes an electronic control unit 50. The electronic control unit 50 is a microcomputer including a CPU 51, a ROM 52, a RAM 53, a back-up RAM 54, and an interface 55.

The interface 55 is connected to the sensors 41 to 44 so that signals from the sensors 41 to 44 are supplied to the CPU 51 and driving signals are transmitted to the motor MT and the solenoid valves (the normally-open linear solenoid valves PC1 and PC2, the pressure-intensifying valve PU, and the pressure-reducing valve PD) of the brake hydraulic-pressure control unit 30 in accordance with an instruction of the CPU 51. In the following, the case where the pressure-intensifying valve PU and the pressure-reducing valve PD are both in the de-excited state, specifically, the relationship "Pw**=Pm+ΔP" is established, is described.

(Characteristics of the Master-Cylinder Hydraulic Pressure, the Linear-Valve Pressure Difference, and the Wheel-Cylinder Hydraulic Pressure)

Figure 4:
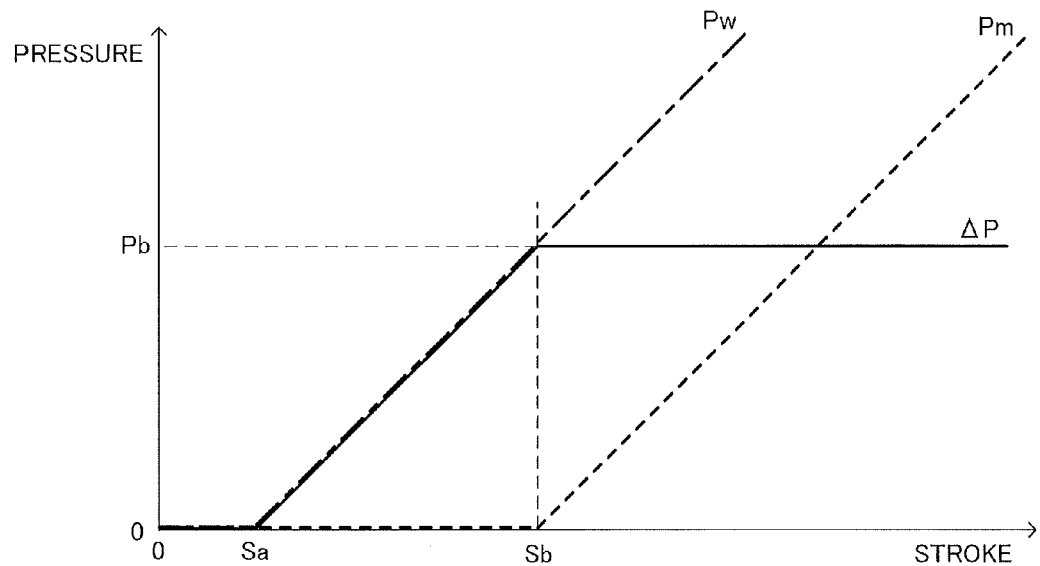
FIG. 4 is a graph showing the relationship between "a stroke of a brake pedal" and "a master-cylinder hydraulic pressure, a wheel-cylinder hydraulic pressure, and a linear-valve pressure difference" in the case where the brake control device illustrated in FIG. 1 is used.

In the brake apparatus 10 for a vehicle, which has the above-mentioned configuration (hereinafter referred to as "this device"), while the vehicle is running, the master-cylinder hydraulic pressure Pm, the linear-valve pressure difference ΔP (command pressure difference ΔPd), and the wheel-cylinder hydraulic pressure Pw (=Pm+ΔP) are adjusted as shown in FIG. 4 with respect to the stroke of the brake pedal BP (hereinafter also referred to simply as "stroke").

Specifically, the master-cylinder hydraulic pressure Pm (see a broken line) is maintained at zero when the stroke is smaller than Sb and increases from zero in accordance with an increase in stroke when the stroke becomes equal to or larger than Sb. The linear-valve pressure difference ΔP (see a solid line) is maintained at zero when the stroke is smaller than Sa (<Sb), increases from zero to Pb in accordance with an increase in stroke when the stroke is between Sa and Sb, and becomes constant at Pb without depending on the stroke when the stroke becomes equal to or larger than Sb. As a result, the wheel-cylinder hydraulic pressure Pw (see an alternate short and long dash line) is maintained at zero while the stroke is smaller than Sa and increases from zero in accordance with an increase in stroke when the stroke becomes equal to or larger than Sa. In addition, a gradient of increase in the master-cylinder hydraulic pressure Pm and that in the linear-valve pressure difference ΔP are the same. Therefore, a gradient of increase in the wheel-cylinder hydraulic pressure Pw is constant over the range in which the stroke is equal to or larger than Sa.

In this device, while the vehicle is running and the brake pedal BP is not being currently operated, the driving of the hydraulic pumps HP1 and HP2 is stopped in principle. However, while the vehicle is running, the hydraulic pumps HP1 and HP2 may be appropriately driven based on a state of the vehicle or the like. On the other hand, when the operation of the brake pedal BP is started while the vehicle is running, the driving of the hydraulic pumps HP1 and HP2 is started. When the vehicle (which is running) is stopped by the operation of the brake pedal BP, the driving of the hydraulic pumps HP1 and HP2 is stopped. Here, whether or not the brake pedal BP is operated can be determined based on the result of detection by the brake-pedal sensor 42, whereas whether or not the vehicle is in the stopped state can be determined based on the results of detection by the wheel-speed sensors 41**.

Figure 5:
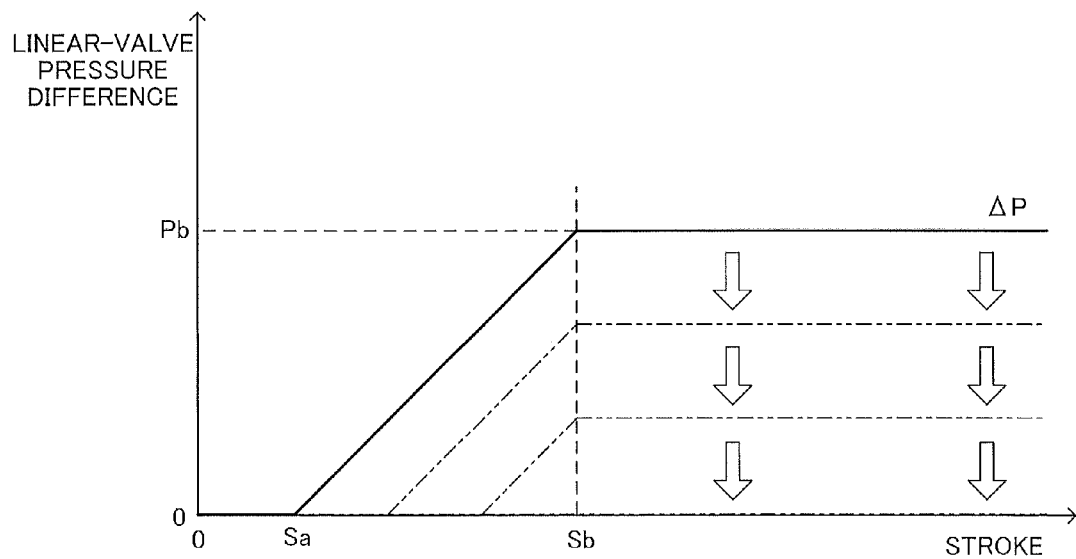
FIG. 5 is a graph showing a state in which "the relationship between the stroke and the linear-valve pressure difference" changes by an increase in the amount of depression of the brake pedal while the vehicle is in a stopped state, in the case where the brake control device illustrated in FIG. 1 is used.

In this device, the above-mentioned characteristic shown in FIG. 4 applies in principle even after the vehicle is stopped by the operation of the brake pedal BP. In addition, in this device, each time the amount of depression of the brake pedal BP increases (that is, each time the stroke increases) while the vehicle is in the stopped state and in a state in which the stroke is larger than Sb (state in which the master-cylinder hydraulic pressure Pm increases in accordance with an increase in the stroke and the relationship $\Delta P>0$ is established), as shown in FIG. 5, the linear-valve pressure difference $\Delta P$ (command pressure difference $\Delta Pd$) decreases by the amount of increase in the master-cylinder hydraulic pressure Pm.

Figure 6:
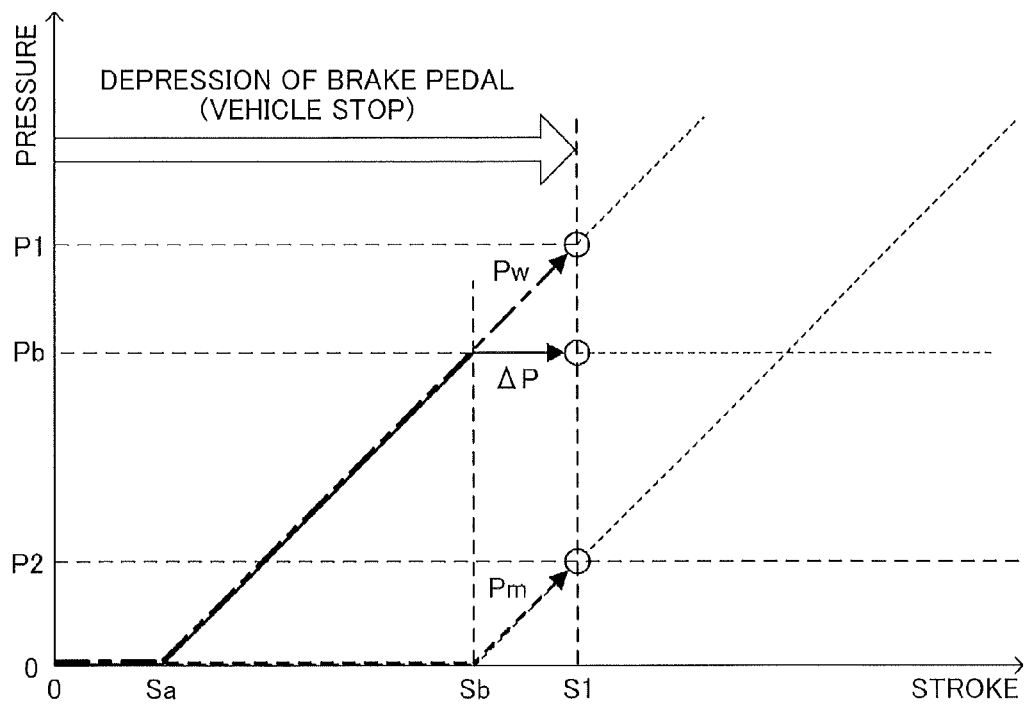
FIG. 6 is a graph showing an example of a change in the master-cylinder hydraulic pressure, the wheel-cylinder hydraulic pressure, and the linear-valve pressure difference when the vehicle in a running state is stopped by depressing the brake pedal, in the case where the brake control device illustrated in FIG. 1 is used.

FIG. 6 shows an example of a change in the master-cylinder hydraulic pressure Pm, the linear-valve pressure difference $\Delta P$, and the wheel-cylinder hydraulic pressure Pw when the vehicle is stopped on a hill (or may be stopped on an even road) by depressing the brake pedal BP while the vehicle is running. In this example, the state of the vehicle transits from the running state to the stopped state while the stroke is maintained at S1 (>Sb) (specifically, Pm=P2, $\Delta P$=Pb, Pw=P1 (=P2+Pb)). Specifically, when Pw=P1 is established, the rollback of the vehicle does not occur on the hill. In this case, the driving of the hydraulic pumps HP1 and HP2, which is started by depressing the brake pedal BP while the vehicle is running, is stopped in accordance with the transition of the state of the vehicle from the running state to the stopped state.

(Increase in the Amount of Depression of the Brake Pedal while the Vehicle is in the Stopped State and the Brake Pedal is being Operated)

Figure 7:
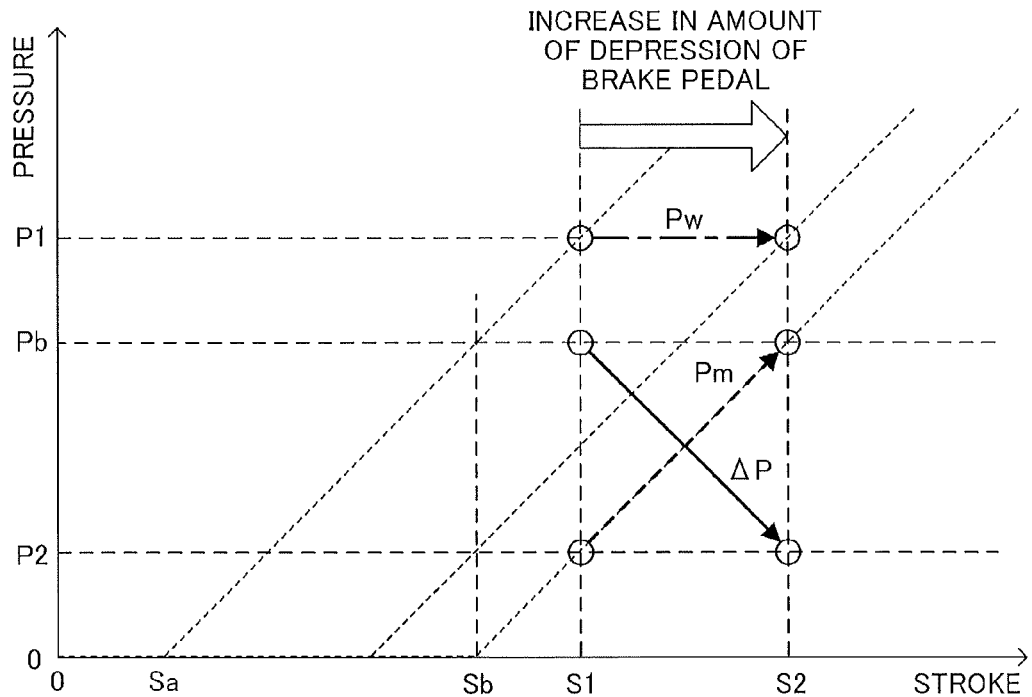
FIG. 7 is a graph showing an example of a change in the master-cylinder hydraulic pressure, the wheel-cylinder hydraulic pressure, and the linear-valve pressure difference when the brake pedal is further depressed in a state shown in FIG. 6 while the vehicle is in the stopped state.

FIG. 7 shows an example of the case where the amount of depression of the brake pedal BP is increased in the state shown in FIG. 6 (stroke=S1). In this example, the stroke increases from S1 to S2 (>S1). With this increase in the stroke, the master-cylinder hydraulic pressure Pm increases from P2 to Pb in accordance with the characteristic indicated by the broken line in FIG. 4. In this case, the linear-valve pressure difference $\Delta P$ (command pressure difference $\Delta Pd$) is not maintained to be constant at Pb but decreases from Pb to P2. For example, the linear-valve pressure difference $\Delta P$ decreases so that the characteristic of the linear-valve pressure difference $\Delta P$ shown in FIG. 4 is offset by the amount of increase in the master-cylinder hydraulic pressure Pm in the direction in which the command pressure difference decreases (see FIG. 5). As a result, the wheel-cylinder hydraulic pressure Pw is maintained to be constant at P1. As described above, in this device, the wheel-cylinder hydraulic pressure Pw is not decreased even if the linear-valve pressure difference $\Delta P$ decreases due to the increase in the amount of depression of the brake pedal BP. Therefore, the roll-back of the vehicle does not occur on the hill. Specifically, the stopped state of the vehicle is maintained. Moreover, even for the driving of the hydraulic pumps HP1 and HP2, the hydraulic pumps HP1 and HP2 are maintained in the stopped state during the operation of increasing the amount of depression of the brake pedal BP.

(Return of the Brake Pedal while the Vehicle is in the Stopped State and the Brake Pedal is being Operated)

Figure 8:
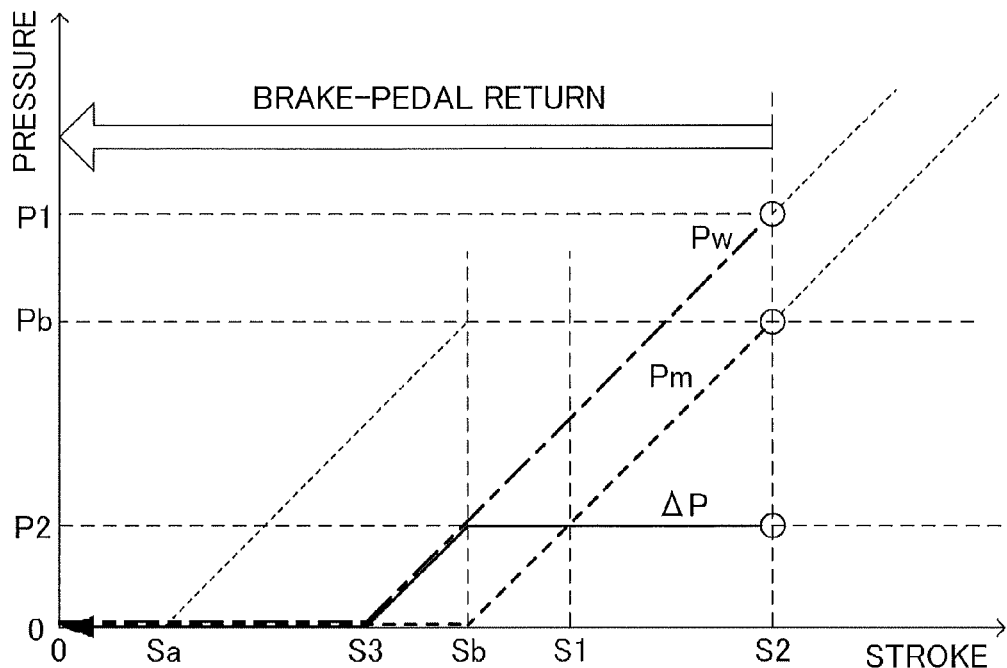
FIG. 8 is a graph showing an example of a change in the master-cylinder hydraulic pressure, the wheel-cylinder hydraulic pressure, and the linear-valve pressure difference when the brake pedal in the state shown in FIG. 7 is returned while the vehicle is in the stopped state.

On the other hand, FIG. 8 shows an example of the case where the brake pedal BP is returned in the state shown in FIG. 7 (stroke=S2). In this example, the stroke decreases from S2 to zero. With this decrease in the stroke, the master-cylinder hydraulic pressure Pm decreases from Pb to zero in accordance with the characteristic indicated by the broken line in FIG. 4. In this case, the linear-valve pressure difference $\Delta P$ (command pressure difference $\Delta Pd$) is maintained at P2 in the range in which the stroke is equal to or larger than Sb, and decreases from P2 to zero in accordance with a decrease in stroke in the range in which the stroke is smaller than Sb (specifically, from S3 to Sb). As a result, the wheel-cylinder hydraulic pressure Pw is decreased by the decrease in the master-cylinder hydraulic pressure Pm in the range in which the stroke is equal to or larger than Sb, and is decreased by a decrease in the linear-valve pressure difference $\Delta P$ in the range in which the stroke is smaller than Sb (specifically, from S3 to Sb). In other words, the "characteristic of the linear-valve pressure difference $\Delta P$ offset in the direction in which the command pressure difference is decreased, by the amount of increase in the master-cylinder hydraulic pressure Pm generated along with an increase in the amount of depression of the brake pedal BP" is maintained, and the linear-valve pressure difference $\Delta P$ decreases in accordance with the characteristic. Here, a gradient of decrease of the master-cylinder hydraulic pressure Pm and a gradient of decrease of the linear-valve pressure difference $\Delta P$ are the same. Therefore, a gradient of decrease of the wheel-cylinder hydraulic pressure Pw is constant over the range of the stroke from S3 to S2.

As described above, in this device, when the operation of retuning the brake pedal BP is performed, the wheel-cylinder hydraulic pressure Pw can be smoothly and reliably decreased in synchronization with the decrease in stroke, that is, the driver's intention to "reduce the wheel-cylinder hydraulic pressure". Moreover, even during the operation of returning the brake pedal BP, the driving of the hydraulic pumps HP1 and HP2 is still maintained in the stopped state.

Figure 9:
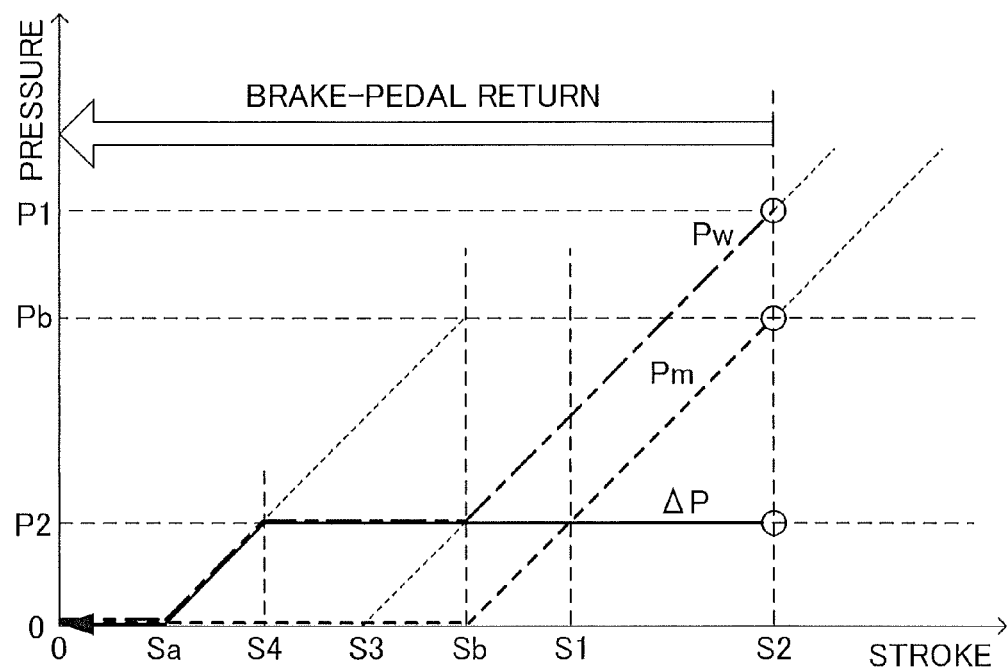
FIG. 9 is a graph of a comparative example, corresponding to FIG. 8.

In the following, the "smooth decrease" in the wheel-cylinder hydraulic pressure Pw is supplementarily described. FIG. 9 shows the case where a comparative example is used in place of this device under the same conditions as those of the example shown in FIG. 8. In this comparative example, when the operation of returning the brake pedal BP is performed, a smaller one of the current value and a value determined in accordance with the characteristic indicated by the solid line in FIG. 4 is determined as the linear-valve pressure difference $\Delta P$. Therefore, in the example shown in FIG. 9, the linear-valve pressure difference $\Delta P$ is still maintained at P2 even after the stroke becomes smaller than Sb, and then decreases from P2 to zero after the time at which the stroke reaches S4.

Therefore, in the process in which the stroke decreases from Sb to S4, the wheel-cylinder hydraulic pressure Pw does not decrease in accordance with the driver's intension. As a result, the timing, at which the vehicle starts rolling back, is delayed, which leads to discomfort (brake-pedal feeling caused by a residual wheel-cylinder hydraulic pressure or feeling as if the vehicle were locked) given to the driver. On the other hand, in this device, as shown in FIG. 8, the wheel-cylinder hydraulic pressure Pw smoothly decreases in a continuous manner even after the stroke becomes smaller than Sb. Therefore, the driver does not feel the above-mentioned discomfort.

(Re-Depression of the Brake Pedal During the Operation of the Brake Pedal after the Vehicle Starts Moving in Response to the Return of the Brake Pedal)

As shown in FIG. 8, while the vehicle is in the stopped state (specifically, while the driving of the hydraulic pumps HP1 and HP2 is in the stopped state) and while the brake pedal is being operated, the braking torque decreases by the operation of returning the brake pedal BP, and hence the vehicle starts moving (the state of the vehicle transits from the stopped state to the moving state) during the operation of returning the brake pedal (specifically, while the brake pedal BP is still being operated) in some cases. It is conceivable to adopt a configuration for starting driving the hydraulic pumps HP1 and HP2 when the start of movement of the vehicle is detected during the operation of returning the brake pedal BP. However, this device does not adopt such a configuration.

The above-mentioned configuration is not adopted based on the following reason. Specifically, when the driving of the hydraulic pumps HP1 and HP2 is started, the amount of working fluid in the reservoir RS of the master cylinder MC temporarily decreases. Due to the temporary decrease or the like, there may inevitably occur a phenomenon in which the amount of operation of the brake pedal slightly increases ("brake pedal retraction phenomenon" described above). Therefore, with the above-mentioned configuration, the "brake pedal retraction phenomenon" occurs during the operation of returning the brake pedal. In other words, the direction of movement of the brake pedal that is caused by the "brake pedal retraction phenomenon" becomes opposite to that of movement of the brake pedal based on the operation of the brake pedal that is performed by the driver. As a result, there arises a problem in that the driver is susceptible to discomfort resulting from the operation of the brake pedal.

Therefore, in this device, when the start of movement of the vehicle is detected during the operation of returning the brake pedal and the operation of re-depressing the brake pedal is detected while the vehicle is in the stopped state (specifically, while the driving of the hydraulic pumps HP1 and HP2 is in the stopped state) and while the brake pedal is being operated, the driving of the hydraulic pumps HP1 and HP2 is started. Whether or not the vehicle has started moving can be determined based on the results of detection by the wheel-speed sensors 41**, whereas whether or not the operation of re-depressing the brake pedal has been performed can be determined based on the result of detection by the brake-pedal sensor 42. In particular, the operation of re-depressing the brake pedal can be detected based on the fact that the gradient of increase in the stroke of the brake pedal becomes equal to or larger than a predetermined value.

In the configuration described above, the hydraulic pumps HP1 and HP2 are maintained in the stopped state after the vehicle starts moving during the operation of returning the brake pedal until the brake pedal is re-depressed. Thereafter, when the operation of re-depressing the brake pedal is detected, the driving of the hydraulic pumps HP1 and HP2 is started. Therefore, during the operation of re-depressing the brake pedal, the "brake pedal retraction phenomenon" occurs. In other words, the direction of movement of the brake pedal that is caused by the "brake pedal retraction phenomenon" is the same as the direction of movement of the brake pedal based on the operation of the brake pedal that is performed by the driver. Therefore, the driver is insusceptible to discomfort resulting from the "brake pedal retraction phenomenon".

Figure 10:
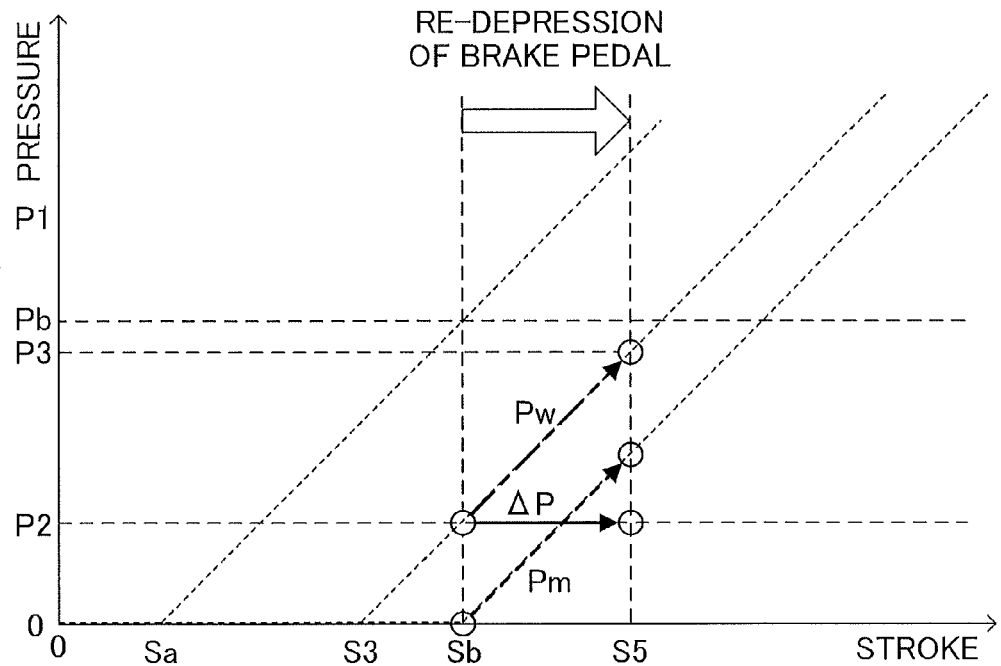
FIG. 10 is a graph showing a first example of a change in the master-cylinder hydraulic pressure, the wheel-cylinder hydraulic pressure, and the linear-valve pressure difference when the brake pedal is re-depressed after the vehicle starts moving during the operation of returning the brake pedal as shown in FIG. 8.
Figure 11:
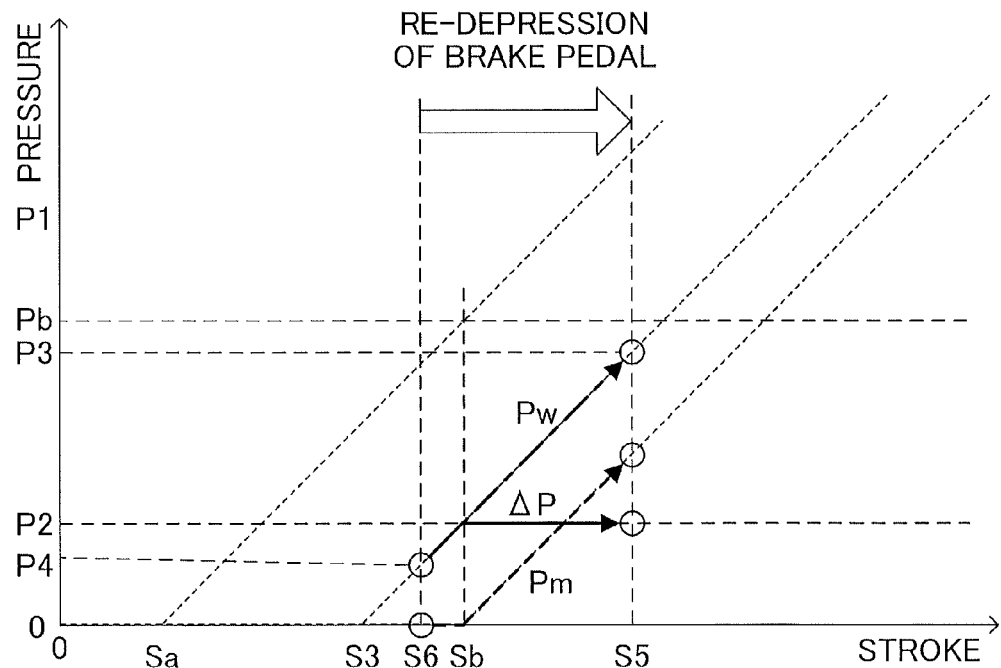
FIG. 11 is a graph showing a second example of the change in the master-cylinder hydraulic pressure, the wheel-cylinder hydraulic pressure, and the linear-valve pressure difference when the brake pedal is re-depressed after the vehicle starts moving during the operation of returning the brake pedal as shown in FIG. 8.
Figure 12:
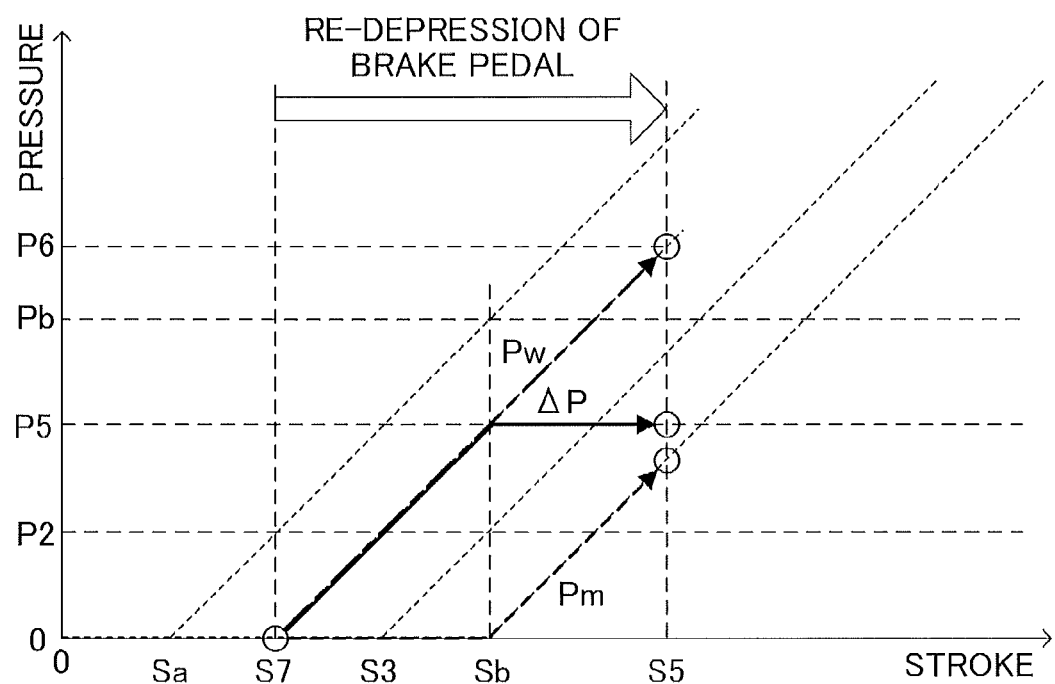
FIG. 12 is a graph showing a third example of the change in the master-cylinder hydraulic pressure, the wheel-cylinder hydraulic pressure, and the linear-valve pressure difference when the brake pedal is re-depressed after the vehicle starts moving during the operation of returning the brake pedal as shown in FIG. 8.

Each of FIGS. 10 to 12 shows the case where the brake pedal is re-depressed after the vehicle starts moving during the operation of returning the brake pedal as shown in FIG. 8. FIG. 10 shows the case where the vehicle starts moving at the "time at which the stroke reaches Sb" during the operation of returning the brake pedal as shown in FIG. 8, and thereafter the stroke increases from Sb to S5 (>Sb) by the operation of re-depressing the brake pedal. At the time at which the stroke becomes Sb, the master-cylinder hydraulic pressure Pm is zero and the linear-valve pressure difference ΔP is P2 (>0). Therefore, the wheel-cylinder hydraulic pressure Pw (=Pm+ΔP) is P2.

Figure 13:
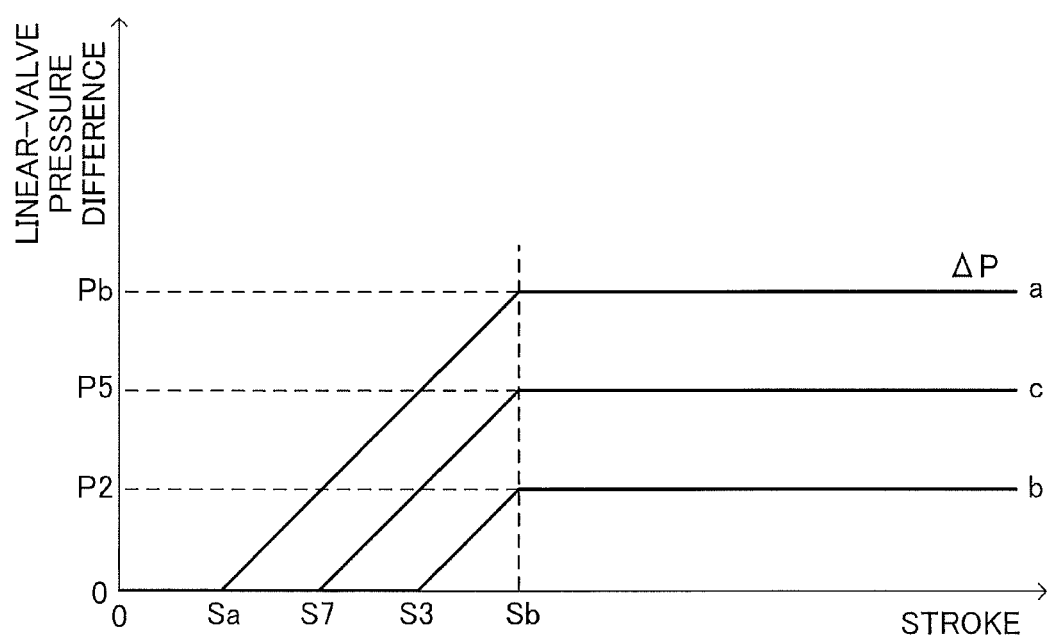
FIG. 13 is a graph for illustrating a shift of "the relationship between the stroke and the linear-valve pressure difference" corresponding to each of the examples shown in FIGS. 10 to 12.

In the case shown in FIG. 10, along with an increase in the stroke from Sb to S5, the master-cylinder hydraulic pressure Pm increases from zero in accordance with the characteristic indicated by the broken line in FIG. 4. On the other hand, the linear-valve pressure difference ΔP (command pressure difference ΔPd) is maintained to be constant at P2. In other words, the linear-valve pressure difference ΔP shifts in accordance with a "characteristic b" shown in FIG. 13 obtained by offsetting the characteristic of the linear-valve pressure difference ΔP indicated by an alternate short and long dash line in FIG. 4 (="characteristic a" shown in FIG. 13) in the direction in which the command pressure difference decreases. As a result, the wheel-cylinder hydraulic pressure Pw (=Pm+ΔP) increases smoothly from P2 to P3 by the increase in the master-cylinder hydraulic pressure Pm.

FIG. 11 shows the case where the vehicle starts moving at the "time at which the stroke reaches S6 (<Sb)" during the operation of returning the brake pedal as shown in FIG. 8, and thereafter the stroke increases from S6 to S5 by the operation of re-depressing the brake pedal. At the time at which the stroke becomes S6, the master-cylinder hydraulic pressure Pm is zero and the linear-valve pressure difference ΔP is P4 (>0). Therefore, the wheel-cylinder hydraulic pressure Pw (=Pm+ΔP) is P4.

In this case, along with the increase in the stroke from S6 to S5, the master-cylinder hydraulic pressure Pm is maintained at zero in the range in which the stroke is smaller than Sb (specifically, from S6 to Sb), and increases from zero in accordance with the increase in the stroke in the range in which the stroke is Sb or larger, based on the characteristic indicated by the broken line in FIG. 4. On the other hand, the linear-valve pressure difference ΔP (command pressure difference ΔPd) increases from P4 to P2 in accordance with the increase in the stroke within the range in which the stroke is smaller than Sb (specifically, from S6 to Sb) and is maintained to be constant at P2 in the range in which the stroke is equal to or larger than Sb. In other words, the linear-valve pressure difference ΔP shifts in accordance with the "characteristic b" shown in FIG. 13 as in the above-mentioned case shown in FIG. 10. As a result, the wheel-cylinder hydraulic pressure Pw (=Pm+ΔP) increases from P4 to P2 based only on the increase in the linear-valve pressure difference ΔP in the range in which the stroke is smaller than Sb (specifically, from S6 to Sb), and increases from P2 to P3 based only on the increase in the master-cylinder hydraulic pressure Pm in the range in which the stroke is equal to or larger than Sb. Here, the gradient of increase in the master-cylinder hydraulic pressure Pm and that in the linear-valve pressure difference ΔP are the same. Therefore, the gradient of increase in the wheel-cylinder hydraulic pressure Pw becomes constant over the range in which the stroke is S6 to S5, and the wheel-cylinder hydraulic pressure Pw increases from P4 to P3 smoothly. In addition, in comparison with the "case where the master-cylinder hydraulic pressure Pm and the linear-valve pressure difference ΔP both increase simultaneously in accordance with the increase in the stroke", the wheel-cylinder hydraulic pressure Pw can be increased smoothly by the amount in accordance with the increase in the stroke.

FIG. 12 shows the case where the vehicle starts moving at the "time at which the stroke reaches S7 (<Sb)" during the operation of returning the brake pedal as shown in FIG. 8, and thereafter the stroke increases from S7 to S5 by the operation of re-depressing the brake pedal. At the time at which the stroke becomes S7, the master-cylinder hydraulic pressure Pm is zero and the linear-valve pressure difference ΔP is also zero. Therefore, the wheel-cylinder hydraulic pressure Pw (=Pm+ΔP) is also zero.

In this case, along with the increase in the stroke from S7 to S5, the master-cylinder hydraulic pressure Pm is maintained at zero in the range in which the stroke is smaller than Sb (specifically, from S7 to Sb), and increases from zero in accordance with the increase in the stroke in the range in which the stroke is Sb or larger, based on the characteristic indicated by the broken line in FIG. 4. On the other hand, the linear-valve pressure difference ΔP (command pressure difference ΔPd) increases from zero to P5 in accordance with the increase in the stroke within the range in which the stroke is smaller than Sb (specifically, from S7 to Sb) and is maintained to be constant at P5 in the range in which the stroke is equal to or larger than Sb. In other words, the linear-valve pressure difference ΔP shifts in accordance with a "characteristic c" shown in FIG. 13 obtained by offsetting the characteristic of the linear-valve pressure difference ΔP indicated by the alternate short and long dash line in FIG. 4 (="characteristic a" shown in FIG. 13) in the direction in which the command pressure difference decreases. As a result, the wheel-cylinder hydraulic pressure Pw (=Pm+ΔP) increases from zero to P5 based only on the increase in the linear-valve pressure difference ΔP in the range in which the stroke is smaller than Sb (specifically, from S7 to Sb), and increases from P5 to P6 based only on the increase in the master-cylinder hydraulic pressure Pm in the range in which the stroke is equal to or larger than Sb. Here, the gradient of increase in the master-cylinder hydraulic pressure Pm and that in the linear-valve pressure difference ΔP are the same. Therefore, the gradient of increase in the wheel-cylinder hydraulic pressure Pw becomes constant over the range in which the stroke is S7 to S5, and the wheel-cylinder hydraulic pressure Pw increases from zero to P6 smoothly. In addition, in comparison with the "case where the master-cylinder hydraulic pressure Pm and the linear-valve pressure difference ΔP both increase simultaneously in accordance with the increase in the stroke", the wheel-cylinder hydraulic pressure Pw can be increased smoothly by the amount in accordance with the increase in the stroke.

Figure 14:
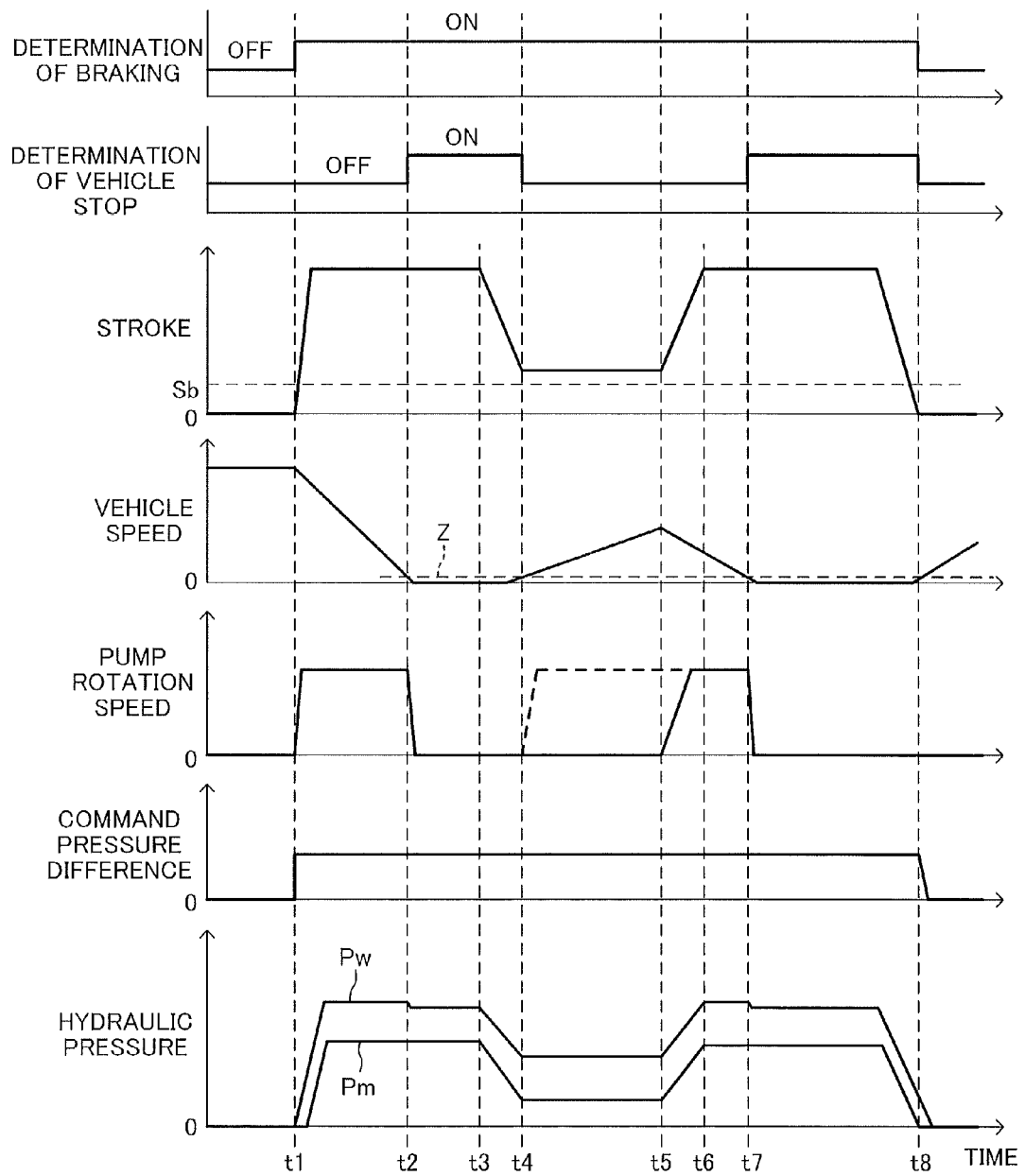
FIG. 14 a time chart illustrating an example of a change in various values in the case where the brake control device illustrated in FIG. 1 is used.

FIG. 14 shows an example of the case where this device is used. In this example, by the depression of the brake pedal BP (stroke>Sb) after a time t1 while the vehicle is running, the vehicle is stopped on a hill (or may be stopped on an even road) at a time t2. A value z is an extremely small value to be compared with a detected vehicle speed for "determination of stop of the vehicle" and "determination of start of movement of the vehicle". At the time t1 corresponding to the start of the operation of the brake pedal, the driving of the hydraulic pumps HP1 and HP2 is started. Then, at the time t2 corresponding to the stop of the vehicle, the driving of the hydraulic pumps HP1 and HP2 is stopped.

Between a time t3 and a time t4 after the vehicle is stopped, the operation of returning the brake pedal is performed (the stroke is still maintained to be larger than Sb). As a result, at the time t4, the vehicle starts moving. Thereafter, between a time t5 and a time t6, the operation of re-depressing the brake pedal is performed. As a result, at a time t7, the vehicle is stopped again. The operation of re-depressing the brake pedal can be detected, for example, based on the fact that the gradient of increase in the stroke becomes equal to larger than a predetermined value. Thereafter, at a time t8, the brake pedal is released, and hence the vehicle starts moving again.

In this example, when the driving of the hydraulic pumps HP1 and HP2 is started at the time t4 at which "the vehicle starts moving by the operation of returning the brake pedal" (see a broken line of a section "pump rotation speed" shown in FIG. 14), the "brake pedal retraction phenomenon" occurs during the operation of returning the brake pedal (or immediately after the completion of the operation of returning the brake pedal) as described above. Therefore, the direction of movement of the brake pedal that is caused by the "brake pedal retraction phenomenon" becomes opposite to that of movement of the brake pedal based on the operation of the brake pedal that is performed by the driver. Therefore, the driver is susceptible to discomfort resulting from the operation of the brake pedal.

On the other hand, in this device, at the time t5 at which "the operation of re-depressing the brake pedal is detected after the vehicle starts moving during the operation of returning the brake pedal", the driving of the hydraulic pumps HP1 and HP2 is started (see a solid line in the section "pump rotation speed" of FIG. 14). Specifically, during the operation of re-depressing the brake pedal, the "brake pedal retraction phenomenon" occurs. Therefore, the direction of movement of the brake pedal that is caused by the "brake pedal retraction phenomenon" becomes the same as that of movement of the brake pedal based on the operation of the brake pedal that is performed by the driver. Therefore, the driver is insusceptible to discomfort resulting from the "brake pedal retraction phenomenon".

In addition, in this example, after the time t5 (after the start of driving of the hydraulic pumps HP1 and HP2), a gradient of increase in the rotation speed of the hydraulic pumps HP1 and HP2 is limited so as to be equal to or smaller than a predetermined value. The gradient of increase in the pump rotation speed is limited based on the following reason. Specifically, in general, as the gradient of increase in the rotation speed of the hydraulic pumps immediately after the start of the driving of the hydraulic pumps becomes larger, a speed of increase in the amount of operation of the brake pedal (retraction speed) that is caused by the "brake pedal retraction phenomenon" becomes larger. Therefore, when the gradient of increase in the rotation speed of the hydraulic pumps HP1 and HP2 is limited, a sudden increase in the amount of operation of the brake pedal that is caused by the "brake pedal retraction phenomenon" is limited. In other words, the "brake pedal retraction phenomenon" cannot occur significantly (but occurs slowly). Therefore, the driver is further insusceptible to discomfort resulting from the "brake pedal retraction phenomenon".

The present invention is not limited to the embodiment described above, and various variations can be adopted within the scope of the present invention. For example, in the embodiment described above, the master-cylinder hydraulic pressure Pm, the linear-valve pressure difference ΔP, and the wheel-cylinder hydraulic pressure Pw are adjusted in accordance with the stroke of the brake pedal BP, as shown in FIG. 4 and the like. However, the master-cylinder hydraulic pressure Pm, the linear-valve pressure difference ΔP, and the wheel-cylinder hydraulic pressure Pw may be adjusted in accordance with the pedaling force on the brake pedal BP.

Moreover, in the embodiment described above, the brake hydraulic-pressure control unit 30 includes the two-system hydraulic circuit for the system relating to the right front wheel FR and the left front wheel FL and the system relating to the right rear wheel RR and the left rear wheel RL. However, the brake hydraulic-pressure control unit 30 may include a two-system hydraulic circuit for a system relating to the left front wheel FL and the right rear wheel RR and a system relating to the right front wheel FR and the left rear wheel RL.

Moreover, the gradient of change in the master-cylinder hydraulic pressure Pm and that in the linear-valve pressure difference ΔP with respect to the stroke are the same in the embodiment described above as shown in FIGS. 4, 8, and the like, but the gradients of change thereof are not required to be the same.

Figure 15:
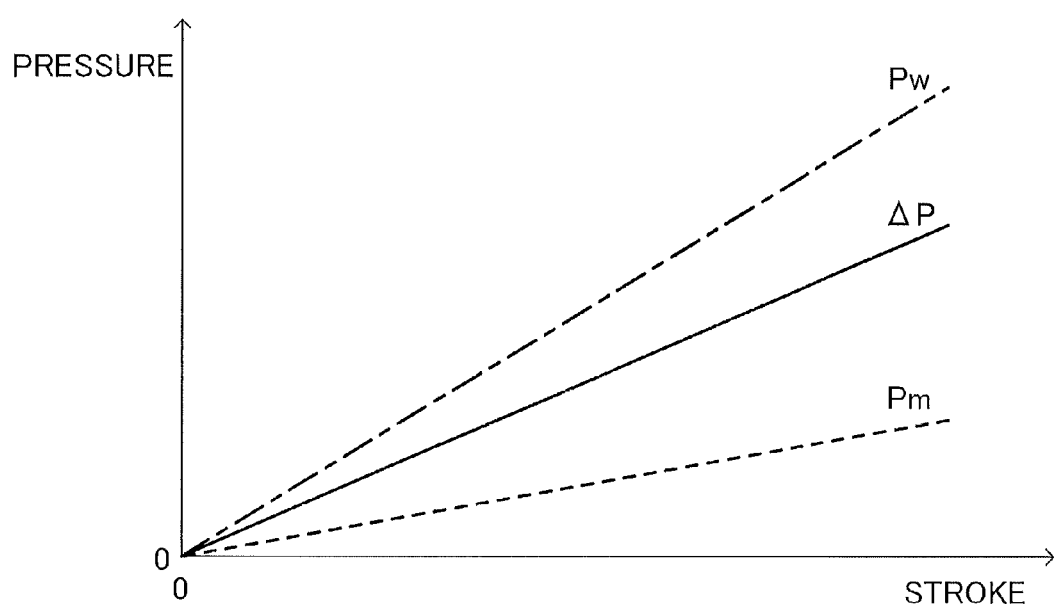
FIG. 15 is a graph corresponding to FIG. 4 in the case where a brake control device for a vehicle according to a variation of the present invention is used.

Further, the master-cylinder hydraulic pressure Pm is configured to be maintained at zero when the stroke is smaller than Sb and to increase from zero in accordance with an increase in the stroke when the stroke is equal to or larger than Sb in the embodiment described above as shown in FIG. 4 and the like. However, the master-cylinder hydraulic pressure Pm may be configured to increase from zero in accordance with an increase in the stroke from zero. In this case, if the linear-valve pressure difference ΔP is additionally configured to increase from zero in accordance with an increase in the stroke from zero as shown in FIG. 15, the wheel-cylinder hydraulic pressure Pw can be smoothly increased from zero in accordance with an increase in the stroke from zero.

What is claimed is:

1. A brake control device for a vehicle to be used for a brake apparatus,
    the brake apparatus comprising:
        basic hydraulic pressure generating means for generating a basic hydraulic pressure in accordance with an operation of a brake operating member that is performed by a driver of the vehicle;
        a pressure control valve provided between an output port of the basic hydraulic pressure generating means and a wheel cylinder;
        a hydraulic pump for supplying pumped braking fluid between the pressure control valve and the wheel cylinder; and
        a friction brake mechanism for generating a friction braking force in accordance with a hydraulic pressure in the wheel cylinder,
    the brake control device comprising:
        control means for controlling a driving state of the hydraulic pump and for controlling the pressure control valve in accordance with an operation-amount correlation value, said operation-amount correlation value comprising a value correlated to an operation amount of the brake operating member, to adjust a pressure difference between the basic hydraulic pressure and a pressure of the fluid between the pressure control valve and the wheel cylinder; and
        determination means for determining whether or not the vehicle is in a stopped state,
    wherein the control means is configured to:
        stop driving the hydraulic pump based on determination of transition of a state of the vehicle from a moving state to the stopped state; and
        start driving the hydraulic pump based on determination of transition of the state of the vehicle from the stopped state to the moving state and determination of an increase in the operation-amount correlation value during the stop of the driving of the hydraulic pump and during the operation of the brake operating member.

2. A brake control device for a vehicle according to claim 1, wherein:
    the brake apparatus is configured so that the basic hydraulic pressure is maintained at zero in a range in which the operation-amount correlation value is from zero to a first predetermined value larger than zero, and increases from zero in accordance with an increase in the operation-amount correlation value from the first predetermined value; and
    the control means is configured to maintain the pressure difference to be constant when the operation-amount correlation value increases within a range equal to or larger than the first predetermined value after the driving of the hydraulic pump is started.

3. A brake control device for a vehicle according to claim 1, wherein:
    the brake apparatus is configured so that the basic hydraulic pressure is maintained at zero in a range in which the operation-amount correlation value is from zero to a first predetermined value larger than zero, and increases from zero in accordance with an increase in the operation-amount correlation value from the first predetermined value; and
    the control means is configured to increase the pressure difference in accordance with an increase in the operation-amount correlation value that occurs within a range smaller than the first predetermined value after the driving of the hydraulic pump is started.

4. A brake control device for a vehicle according to claim 1, wherein the control means is configured to control the driving state of the hydraulic pump so that a gradient of increase in a rotation speed of the hydraulic pump becomes equal to or smaller than a predetermined value after the driving of the hydraulic pump is started.

* * * * *